United States Patent [19]

Assaf et al.

[11] Patent Number: 5,249,430

[45] Date of Patent: Oct. 5, 1993

[54] METHOD OF AND MEANS FOR CONTROLLING THE CONDITION OF AIR IN AN ENCLOSURE

[75] Inventors: Gad Assaf, Rehovot; Uriyel Fisher, Haifa, both of Israel

[73] Assignee: Geophysical Engineering Company, Seattle, Wash.

[21] Appl. No.: 993,443

[22] Filed: Dec. 16, 1992

Related U.S. Application Data

[63] Continuation of Ser. No. 692,173, Apr. 26, 1991, abandoned, which is a continuation of Ser. No. 316,915, Feb. 28, 1989, Pat. No. 5,020,333, which is a continuation-in-part of Ser. No. 479,009, Mar. 25, 1983, Pat. No. 4,819,447, which is a continuation-in-part of Ser. No. 377,368, May 12, 1982, abandoned.

[51] Int. Cl.⁵ ............................................. F25D 23/00
[52] U.S. Cl. ........................................ 62/94; 62/271
[58] Field of Search ............... 62/238.1, 92, 93, 94, 62/323.1, 323.2, 271; 55/228

[56] References Cited

U.S. PATENT DOCUMENTS 4,691,530  9/1987  Meckler ........................... 62/271 X

*Primary Examiner*—Henry A. Bennett
*Attorney, Agent, or Firm*—Sandler Greenblum & Bernstein

[57] ABSTRACT

Apparatus for conditioning air in an enclosure includes a direct contact air/brine heat exchanger with which air in the enclosure is exchanged, and a reservoir of brine. A first brine loop is established by which brine from the reservoir is exchanged with the direct contact heat exchanger for condensing water vapor in the enclosure air onto the brine to form dilute brine that flows into the reservoir. The apparatus also includes a brine concentrator for evaporating water from the dilute brine in the first loop to produce concentrated brine that is supplied to the reservoir. The brine concentrator is preferably constructed and arranged such that a thin film of dilute brine in the first loop flows over a heat transfer surface that is heated by flue gases from a burner.

16 Claims, 5 Drawing Sheets

METHOD OF AND MEANS FOR CONTROLLING THE CONDITION OF AIR IN AN ENCLOSURE

RELATED APPLICATIONS

This application is a continuation of application Ser. No. 07/692,173, filed Apr. 26, 1991, now abandoned; which is a continuation of U.S. Ser. No. 07/316,915 filed Feb. 28, 1989 which issued as U.S. Pat. No. 5,020,333 on Jun. 4, 1991; which application is a continuation-in-part of application Ser. No. 479,009 filed Mar. 23, 1983, now U.S. Pat. No. 4,819,447 the disclosure of which is hereby incorporated by reference, which is a continuation-in-part of application Ser. No. 377,368, filed May 12, 1982 (now abandoned), the disclosure of which is hereby incorporated by reference. The present application is also related to application Ser. No. 069,091 filed Jul. 2, 1987, the disclosure of which is hereby incorporated by reference, which is also a continuation-in-part of application Ser. No. 479,009, filed Mar. 23, 1983.

TECHNICAL FIELD

This invention relates to a method of and means for conditioning air in an enclosure, and more particularly for controlling the temperature and humidity of air in an enclosure such as a greenhouse.

BACKGROUND OF THE INVENTION

U.S. patent application Ser. No. 479,009 discloses apparatus for conditioning the air in an enclosure by utilizing a direct contact air/brine heat exchanger in which enclosure air is directly contacted with brine from a reservoir for condensing water vapor in the enclosure onto the brine to form diluted brine. The diluted brine is regenerated in a fuel fired boiler producing steam that may be piped into an indirect contact heat exchanger located in the enclosure for the purpose of heating the air in the enclosure. Dilute brine from the direct contact heat exchanger is piped to the boiler through a counter-flow heat exchanger in which the dilute brine absorbs heat from, and thus cools, the concentrated brine extracted from the boiler. The resultant cooled concentrated brine is transferred to a reservoir from which brine is applied to the direct contact air/brine heat exchanger. With this arrangement, the temperature of the concentrated brine entering the direct contact air/brine heat exchanger is kept as low as possible. That is to say, the vapor pressure at the air/brine interface of the brine entering the direct contact air/brine heat exchanger will almost always be less than the vapor pressure of the air in the enclosure with the result that the brine entering the direct contact heat exchanger will be hygroscopic and will thus absorb moisture from the air.

An object of the present invention is to minimize the physical size of the apparatus described above, and to improve its efficiency, for example, by minimizing fuel consumption, and by increasing the amount of heat returned to the enclosure.

BRIEF DESCRIPTION OF THE INVENTION

Apparatus for conditioning air in an enclosure comprises a direct contact air/brine heat exchanger, and means for exchanging air in the enclosure with the direct contact heat exchanger. A reservoir of concentrated brine is provided to establish a first brine loop in which brine from the reservoir is exchanged with the direct contact heat exchanger for condensing water vapor in the enclosure air into the brine to form dilute brine which flows back into the reservoir. The apparatus also includes a brine boiler, and means for establishing a second brine loop in which dilute brine from the first loop is exchanged with the boiler for evaporating water from the dilute brine and producing steam. According to the present invention, the brine boiler may include a chamber for holding dilute brine passed thereto from the first loop, and burner means for producing flue gases that directly contact a heat transfer surface of the boiler. The boiler is constructed and arranged so that dilute brine from the chamber flows in a thin film over the heat transfer surface for producing concentrated brine by evaporating water into steam from the thin film of dilute brine. Before the heated concentrated brine is returned to the reservoir, it flows in heat exchange relationship with dilute brine that is passed to the boiler thereby cooling the concentrated brine before it is returned to the first loop and preserving the hygroscopic nature of the brine therein.

BRIEF DESCRIPTION OF THE DRAWINGS

Embodiments of the present invention are disclosed in the accompanying drawings wherein.

DETAILED DESCRIPTION

Figure 1:
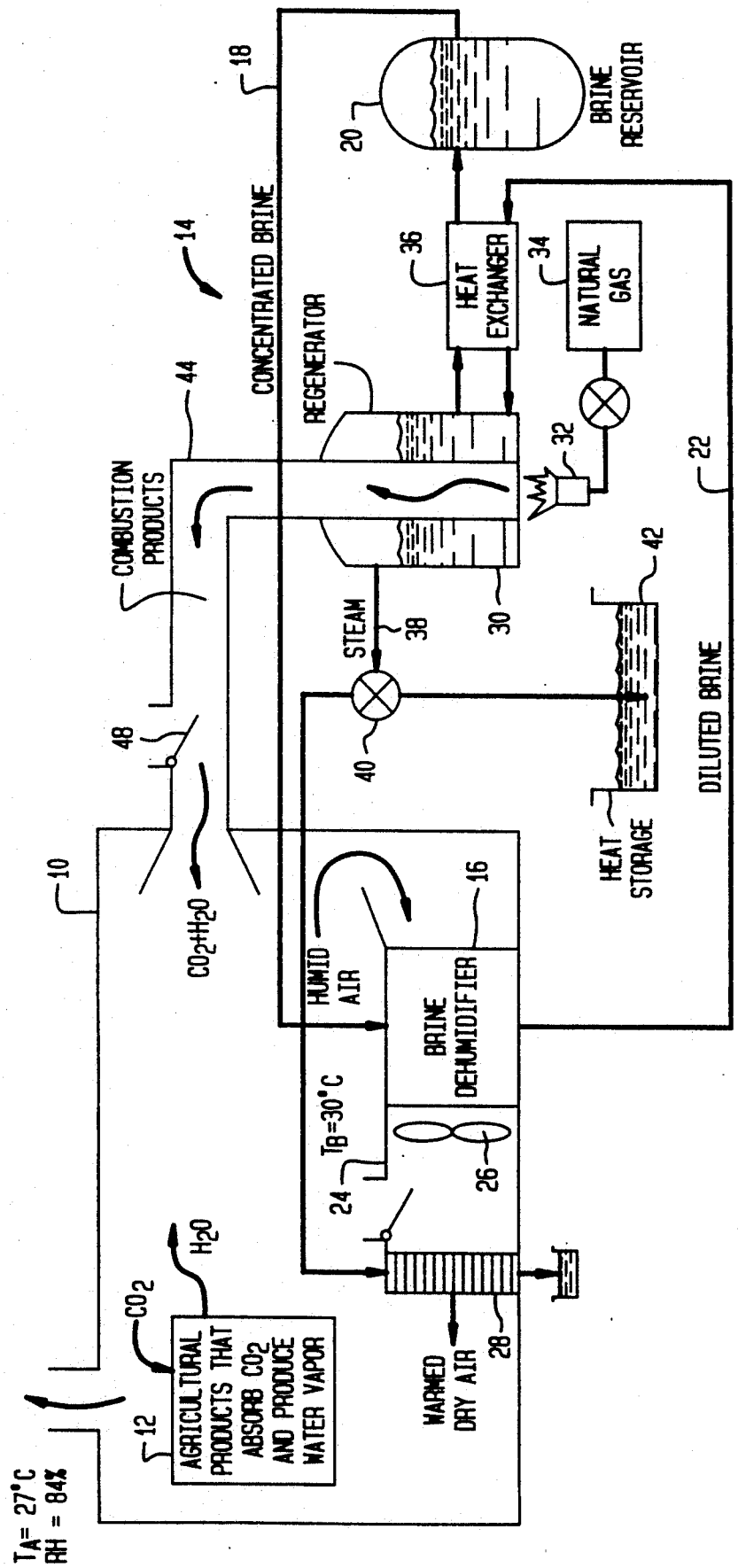
FIG. 1 is a block diagram showing the general environment of the present invention.

Referring now to the drawings, reference numeral 10 designates an enclosure in the form of a greenhouse containing agricultural products 12 that absorb carbon dioxide during daylight hours and produce water vapor. At night, products 12 are quiescent. Associated with greenhouse 10 is apparatus 14 which comprises direct contact air/brine heat exchanger 16 to which concentrated brine is supplied by conduit 18 from brine reservoir 20, and from which dilute brine is obtained by conduit 22. Dehumidifier 16 may comprise a felt pad or mat of jute material and provides a large surface area over which the concentrated brine is fed to form a thin film of brine exposed to the air. Thus, dehumidifier 16 operates as a thin film, direct contact air/brine heat exchanger as described below.

Duct 24 contained within greenhouse 10, and within which brine dehumidifier 16 is located, provides means for recirculating air in the greenhouse through the dehumidifier. Specifically, duct 24 contains fan 26 which draws humid air in the greenhouse through the dehumidifier and causes the air to pass through heat exchanger or radiator 28 before the air is reintroduced to the greenhouse.

Boiler 30, associated with brine reservoir 20, is heated by fuel burned in burner 32 which is connected to source 34 of fuel. Dilute brine from conduit 22 is pumped, or flows by gravity, through counter-flow heat exchanger 36 and enters boiler 30 where the brine is regenerated. The boiler concentrates the dilute brine by evaporating water therefrom producing steam. Conduit 38 carries the steam to valve 40 which selectively directs the steam into radiator 28 (if the greenhouse must be heated), or into water tank 42 when the heat of the steam must be stored for use at a later time.

Boiler 30 thus concentrates the dilute brine; and the concentrated brine passes through heat exchanger 36 into brine reservoir 20. The hot, concentrated brine produced by the boiler is cooled in heat exchanger 36 before being delivered to brine reservoir 20; and heat extracted from the concentrated brine is transferred to the incoming dilute brine.

Preferably, the fuel burned in boiler 32 is liquefied petroleum gas or natural gas in order to limit the products of combustion to carbon dioxide and water. The products of combustion produced by the burned fuel associated with burner 30 may be piped by ductwork 44 into greenhouse 10 such that the products of combustion, namely carbon dioxide and water, are transferred into the greenhouse. This arrangement, however, is optional.

During daylight hours, when the agricultural products such as flowers or vegetables are growing, they actively absorb carbon dioxide from the air in the greenhouse. The active agricultural products also give off water vapor which adds to the water vapor introduced into the greenhouse by the products of combustion. In the absence of steps to the contrary, an almost saturated condition will occur in the greenhouse. The purpose of dehumidifier 16 is to dehumidify the air within the greenhouse and thus maintain the humidity at an appropriate level. Additionally, dehumidifier 16 serves to increase the temperature of the air in the greenhouse in a manner explained below. Effectively, dehumidifier 16 is designed to maintain a humidity within the greenhouse below a level typically 85%, and preferably between 80% and 85%. As explained below, the humidity of the air will be a function of the concentration of brine in the dehumidifier, the effective area of the brine dehumidifier and the mass flow therethrough.

If it is desirable, steam from boiler 30 can be introduced into heat exchanger 28 for purposes of further increasing the temperature of the air in the greenhouse, or valve 40 can be selectively operated to direct the steam into water tank 42 for the purpose of storing the heat produced during the brine regeneration process. At night, when excess carbon dioxide is not needed in the greenhouse, the operation of boiler 30 can be suspended; and the heat stored in water tank 42 is a consequence of daytime operation of the boiler is available for heating the enclosure by supplying the stored hot water to a radiator 28. Alternatively, the steam produced by the boiler, for example, can be directed to a network of pipes buried in the ground beneath the greenhouse thus storing the heat in the ground. When the greenhouse is based on hydrophonic operation, the steam produced by the boiler can be used to heat the liquid that are used in the hydrophonic process.

Dehumidifier 16 may be conventional in the sense that it is a direct contact heat exchanger in which concentrated brine is applied to a felt, jute, or paper or plastic mat as a thin film. Alternatively, the mat may be a capillary web through which the brine flows slowly. The flow rate of the brine can be reduced to a level that just keeps the mat wet. To obtain the high concentration required for the brine, calcium chloride is the preferred salt; but other salts such as magnesium chloride, lithium chloride, sodium hydroxide or mixtures of salt can be used. Dead sea end brine can also be used; and, if preferred, other liquids having hygroscopic properties, such as solutions based on ethylene glycol, can be used in the present invention. The vapor pressure of concentrated brine, or other liquid used, is small compared with the saturated vapor pressure of water at the same temperature. When concentrated brine is exposed to the air in the greenhouse, the water vapor in the air condenses on the brine. The latent heat of condensation supplied to the brine during condensation of water vapor heats the brine film; and the heated brine transfers its heat to the air flowing over the brine. This is an isentropic process in which the temperature of the brine remains substantially constant as the air is warmed and dried in passing through the dehumidifier. This process is described in greater detail below.

The fuel required to regenerate the brine and provide carbon dioxide during the day would be about 15-20 Kg/1000 m$^2$ of greenhouse area which will provide about 10 hours of operation per day. In some environments, the operation need be carried out for only 3 to 4 hours during the day because the temperature of the greenhouse will become excessive insofar as the agricultural products are concerned. This requires either a shutdown of the system or the introduction of outside air into the greenhouse.

To provide suitable control over the operation of the system shown in FIG. 1, duct 44 may be provided with an adjustable butterfly valve 48 for controlling the rate at which the products of combustion are admitted into greenhouse 10, and a suitable valve (not shown) may be provided in duct 24 and in the greenhouse itself for the purpose of controlling the flow of air into the duct and into the greenhouse, respectively. If preferred, duct 24 may be positioned externally of the greenhouse.

If desirable, it is possible to use the apparatus described above to moisten the air in the enclosure rather than dehumidify it. This can be achieved by using brine in reservoir 20 and dehumidifier 16 of such a concentration so that its vapor pressure in dehumidifier 16 is large compared with the saturated vapor pressure of water at the same temperature. Thus, when such brine is exposed to the air in the greenhouse, water vapor will be given off from the brine into the air in the greenhouse. Alternatively, steam from boiler 30 can be introduced directly into the air in the greenhouse.

Figure 2:
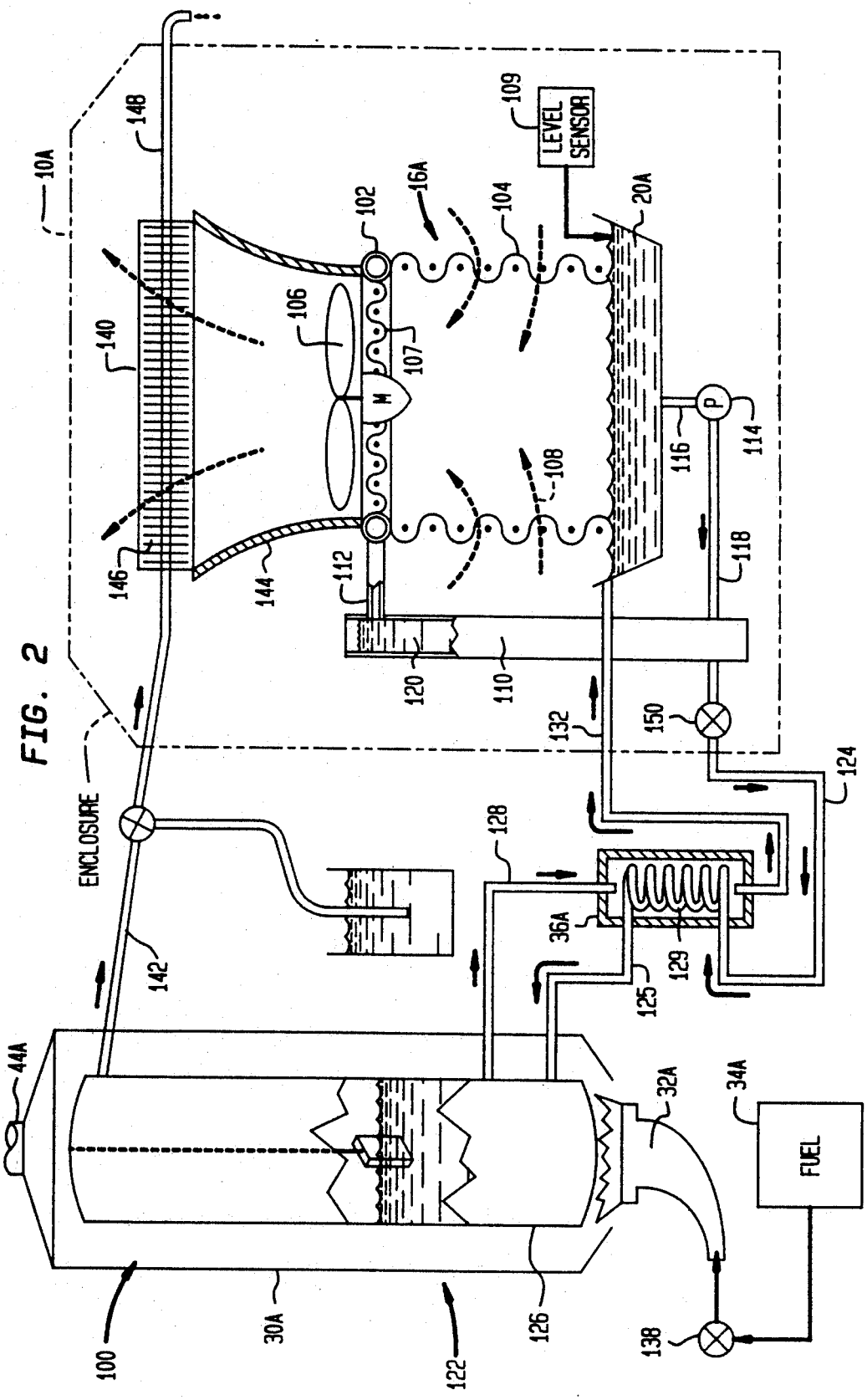
FIG. 2 is a schematic diagram showing the preferred construction of the direct contact air/brine heat exchanger and the boiler shown in FIG. 1.

The preferred construction of the present invention is illustrated in FIG. 2 to which reference is now made. Apparatus 100 shown in FIG. 2 comprises direct contact air/brine heat exchanger 16A which includes header 102 for receiving brine from reservoir 20a located below the header, and air permeable cylindrical sleeve 104 interposed between header 102 and the reservoir. Sleeve 104 may be a mat or woven mesh suspended by a metal reinforcing screen for the purpose of providing structural rigidity in maintaining a cylindrical form in the face of drag forces exerted on the cylinder by reason of the flow of air described below.

Header 102 includes spray heads (not shown) for distributing brine to sleeve 104 whereby the brine falls in a film from the header to the reservoir.

The operation of blower fan 106 located above header 102 draws air from enclosure 10A through sleeve 104 in the manner shown by arrows 108 thereby contacting the air in the enclosure with the film of brine flowing downwardly over cylinder 104. Demister 107 suspended from header 102 below blower fan 106 separates any droplets of brine entrained in the air as it passes over the film of brine on sleeve 104 before the air is returned to the enclosure.

Adjacent to cylinder 104 is vertical standpipe 110 extending vertically from a region slightly lower than reservoir 20A to a point just higher than header 102. Standpipe 110 is closed at its bottom end but open to the air in enclosure 10A at the top. Conduit 112 connects the top region of standpipe 110 to header 102. Pump 114 located below reservoir 20A and connected by conduit 116 to the reservoir pumps brine from the reservoir into the bottom of standpipe 110 through conduit 118. The output of pump 114 is adjusted such that standpipe 110 is filled with brine from reservoir 20A as indicated by reference numeral 120, to a level just slightly above conduit 112 through which concentrated brine flows into header 102. However, if preferred, brine that exits from pump 114 can be pumped directly to header 102 via a suitable conduit.

As shown in FIG. 2, a first brine loop is defined by reservoir 20A, conduit 118, standpipe 110, conduit 112, and sleeve 104. When pump 114 operates, brine contained in reservoir 20A flows into the bottom of standpipe 110, rises in the standpipe to a level just above conduit 112, and then flows into the header. From the header, the brine is circumferentially deposited onto sleeve 104, flows downwardly, and returns to the reservoir.

As indicated above, fan 106 is effective to exchange air between the enclosure and heat exchanger 16A with the result that the hygroscopic brine flowing downwardly in a film over sleeve 104 is contacted by the air flow produced as a consequence of the operation of fan 106, and interacts with the air. Because the brine is hygroscopic, moisture in the air in the enclosure is absorbed by the brine which becomes more dilute as the brine flows downwardly into the reservoir.

Brine concentrator 122 for reconcentrating the brine in reservoir 20A is a part of a second brine loop that includes brine boiler 30A, dilute brine conduit 124 for conveying brine from pump 114 to brine tank 126 inside boiler 30A, and concentrated brine conduit 128 for conveying brine from tank 126 back to reservoir 20a. Indirect heat exchanger 36A interconnects conduits 124 and 128 such that these conduits are in heat exchange relationship. Preferably, heat exchanger 36A is in the form of a closed cylinder containing coil 129 connected to conduit 124, and with conduit 128 being attached at one end of the cylinder. The other end of the cylinder is connected to reservoir 20A by conduit 132. In this manner, dilute brine from reservoir 20A pressurized by pump 114 flows in one direction essentially through cylinder 130 while warm brine from boiler 126 flows oppositely outside coil 129 connected to conduit 124.

Boiler 30A also includes burner 32A which burns fuel from tank 34A. Valve 138 controls the rate at which fuel is supplied to burner 32A. The operation of valve 138 itself is controlled by level sensor 109. Flue gases produced by the burning fuel pass upwardly though a jacket that surrounds tank 126, and then are exhausted at flue 44A. Preferably, tank 126 is constructed of enamel coated, normal low-carbon content steel (the enamel coating being only on the side in contact with the brine), stainless steel, titanium, nickel, or an alloy of zinc, tin and copper (admiralty brass). In a preferred embodiment, cathode protection methods are used in boiler 30A with cathode 127, preferably zinc, being attached to tank 126.

When titanium or admiralty brass is used, a fire protection layer, preferably a steel layer, is positioned on the external surface of the lower portion of tank 126 for protecting the tank against overheating. In order to reduce possible corrosion in boiler 30A, it is important to minimize the amount of oxygen present in the brine contained in tank 126. This is achieved in the present embodiment by providing means (not shown) for impeding the brine flow in the second loop when burner 32A stops operation. Operation of burner 32A is controlled by level sensor 109, the burner being stopped when the brine level in reservoir 20A drops below level sensor 109, only to be restarted when the brine once again reaches the level of level sensor 109.

Finally, the top of tank 126 is connected by conduit 142 to heat exchanger 140 located inside enclosure 10A at the outlet of shroud 144 that provides a venturi-like arrangement in connection with fan 106. Heat exchanger 140 contains fins 146 which provide a large area for transferring heat from steam flowing into the heat exchanger from the boiler. The condensate produced by the condensation of steam in heat exchanger 140 is carried off by conduit 148 and collected or otherwise disposed of as indicated. Optionally, heat exchanger 140 can be positioned below fan 106; and furthermore, fan 106 may be replaced by two fans or a fan set.

In order to increase the efficiency of the operation of the apparatus shown in FIG. 2, constriction 150 in the form of a selectively operable valve is provided in conduit 124 for the purpose of ensuring that the flow of brine in the second brine loop is small as compared to the flow of brine in the first loop. Preferably, flow control means 150 is constructed and arranged to maintain at least an order of magnitude difference between the flow rates of the first and second brine loops. Preferably, the flow rate in the second loop is about 1/20 of the flow rate of the first loop.

The preferred construction of the present invention shown in FIG. 2 provides for the return to the enclosure of practically all of the heat added to the dilute brine in boiler 122 by the burning of fuel. That is to say, the sensible heat added to the dilute brine in the boiler, the heat of vaporization by which water is evaporated from the dilute brine, and the latent heat of condensation by which steam produced by the boiler is condensed to water vapor, are all returned to the enclosure by the operation of heat exchanger 36A, and heat exchanger 140. Furthermore, this heat is returned to the air in the enclosure rather than to the brine and then to the air. Consequently, the temperature of the concentrated brine applied to the sleeve 104 on direct contact heat exchanger 16A is kept as low as possible with the result that the brine is as hygroscopic as possible. As a result, the system will operate at maximum possible efficiency.

Figure 2A:
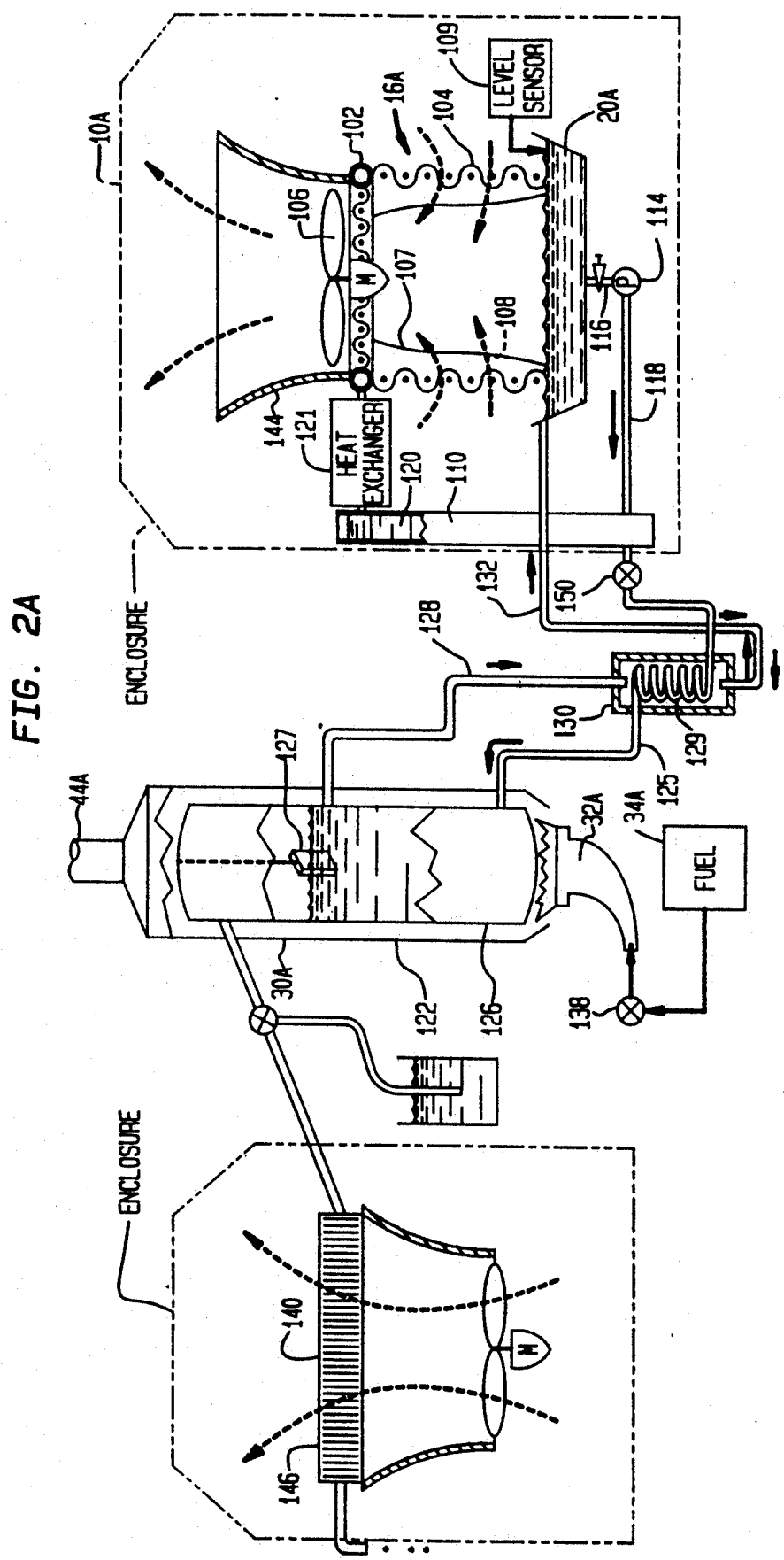
FIG. 2A is a schematic showing a further embodiment of the present invention.

Optionally, heat exchanger 140 can be located in a different enclosure to provide heating (see FIG. 2A). In such case, brine used in direct contact air/brine heat exchanger 16A can be further cooled to relatively low temperature using, for example, glycol or a glycol/water mixture in order to cool the enclosure in which direct contact heat exchanger 16A is located. The low temperature of the brine also ensures, at the same time, the maintenance of the hygroscopic nature of the brine.

Preferably, the brine flow rate in the first loop should be about two orders of magnitude (about 100 times)

greater than the rate of at which water is removed from the air in the enclosure. In typical enclosure applications (i.e., in greenhouses, enclosed swimming pools, etc.), the rate of removal of water will be about 10-20 Kg/h, so that the flow rate of brine in the first loop will be in the range 1-2 m$^3$/h. In such case, the heat of condensation absorbed by the brine as water vapor from the air in the enclosure condenses on the brine in the direct contact heat exchanger is almost immediately returned to the air in the enclosure because under the conditions indicated, the dehumidification process is carried out under conditions of constant enthalpy as described below. Thus, the water vapor present in the air is converted into heat which is almost immediately returned to the air in the enclosure with little heat being stored in the brine itself. Also, in systems where cool conditions are required such as enclosures where mushrooms are grown or food or vegetables are stored, the present apparatus may be used to prevent the load on the existing systems from increasing by exhausting water vapor produced in the brine concentrator directly into the external surroundings of the enclosure.

If the flow rate of brine in the second loop (which is associated with the boiler) were the same as the flow rate in the first loop (which is associated with the enclosure), then large quantities of heat would be required to heat the brine in the boiler. The amount of heat necessary could be reduced, of course, by the use of a preheater, but this approach would require a physically large preheater to provide the necessary heat exchange area. Therefore, the present invention involves minimizing the flow rate of brine entering and exiting the boiler and flowing through the preheater (i.e., the brine flow in the second loop) in order to minimize the physical size of the system and provide the most efficient operation from an energy standpoint.

That the approach according to the present invention leads to these results is demonstrated below. Consider first what is termed the adiabatic conversion efficiency (ACE) of the system:

$$ACE = (\eta)(C_{pa})(M_a)(\Delta T_{ba}) \qquad (1)$$

where
$\eta = (\Delta T_{air})/(\Delta T_{ba})$, the approach parameter;
$M_a$ = air flow rate (Kg/h)
$C_{pa}$ = specific heat of air
$\Delta T_{air}$ = temp. diff. btwn. inlet and oulet air
$\Delta T_{ba}$ = temp. diff. btwn. brine and inlet air.

Figure 3:
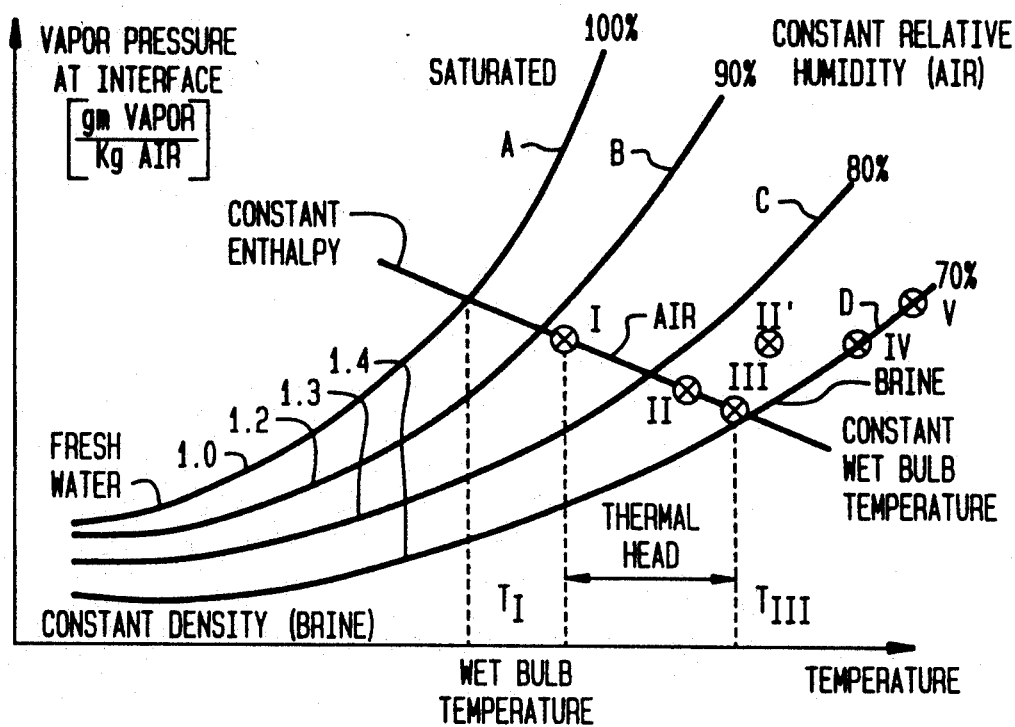
FIG. 3 is a psychrometric chart for illustrating the operation of the present invention.

Consider now the psychrometric chart shown in FIG. 3. Point I represents the starting condition of the air in the enclosure at the inlet to direct contact heat exchanger 16A, and gives the temperature and humidity of the air. Point II represents the end condition of the air at the outlet of the direct contact heat exchanger. Point III represents condition of the brine at the air/brine interface when the heat load on the brine is zero and the system is functioning adiabatically. Point V represents the condition of the brine when the heat load is large. The vapor pressure of the brine at point V is larger than the vapor pressure of the air at point I. Finally, point IV represents the condition of the brine at the air/brine interface when the temperature of the brine has dropped due to evaporation. At point IV, the vapor pressure of the brine is the same as the vapor pressure of the air at point I.

Point II' represents the condition of the air at the exit of the direct contact heat exchanger when the heat load is so large that the air exiting from the heat exchanger has the same absolute humidity as the air entering the heat exchanger (i.e., the heat exchanger is operating adiabatically).

Relating the expressions in Eq. (1) to FIG. 3:

$$\Delta T_{ba} = T_{III} - T_I$$

$$\Delta T_{air} = T_{II} - T_I.$$

The closer $\eta$ approaches unity, the closer is the approach of the temperature of the exit air to the temperature of the brine at the air/brine interface. However, when the heat load is large, evaporation of water from the brine can exceed the condensation of water from the air onto the brine causing the direct contact heat exchanger to act as a humidifier instead of a dehumidifier.

If the heat load on the brine is $Q_b$, the efficiency of the direct contact heat exchanger can be expressed as:

$$EF = ACE \, [1 - (v)(Q_b)/ACE)] \qquad (2)$$

where
$v$ = is the fraction of $Q_b$ which is released as vapor. Thus, the more concentrated the brine, the smaller v becomes. On the other hand, as the brine becomes more concentrated, saturation may be reached; and salt precipitation may result which is undesirable for obvious reasons. Therefore, if the brine concentration and ACE have been maximized, the only way to increase the efficiency is to minimize the heat load $Q_b$. Possible ways to achieve this end are examined below.

Referring to FIG. 1, the heat transfer that occurs in preheater 36A can be expressed as follows:

$$h[(T_{132}-T_{124})+(T_{128}-T_{125})] = (2)(C_{pb})(m)(T_{125}-T_{124}). \qquad (3)$$

On the other hand, applying heat conservation considerations to preheater 36A yields:

$$m(T_{125}-T_{124}) = (m-m_o)(T_{128}-T_{132}) \qquad (4)$$

where
h = heat transfer rate (Watts/°C.)
m = flow rate of brine entering preheater and boiler (Kg/h)
$m_o$ = evaporation rate in the boiler (Kg/h)
$C_{pb}$ = specific heat of the brine
$T_{124}$, $T_{125}$, $T_{128}$, and $T_{132}$ are the temperatures at the inlets and outlets of preheater 36A in °C.

Solving Eqs. (3) and (4) yields:

$$T_{125} = [T_{132} + T_{128} + T_{124}\{(mC_{pb}/h)-1\}]/\{(2mC_{pb}/h)+1\} \qquad (5)$$

$$h = X/Y \qquad (6)$$

$$X = 2mC_{pb}[(m-m_o)(T_{128}-T_{132})/m] \qquad (7)$$

$$Y = T_{132} + T_{128} - 2T_{124} - [(m-m_o)(T_{128}-T_{132})/m] \qquad (8)$$

The following chart was obtained using actual values measured from an actual system constructed in accordance with the present invention:

| $T_{124}$ °C. | $T_{125}$ °C. | $T_{128}$ °C. | $T_{132}$ °C. | m Kg/h | $m_o$ Kg/h | h W/°C. | $Q_b$ KW | ACE KW | EF |
|---|---|---|---|---|---|---|---|---|---|
| 15 | 74 | 120 | 40 | 97 | 19 | 116 | 1.4 | 13.3 | 0.95* |
| 15 | 85 | 120 | 40 | 194 | 19 | 332 | 3.8 | 13.3 | 0.86 |
| 15 | 90 | 120 | 40 | 388 | 19 | 759 | 6.4 | 13.3 | 0.75 |
| 15 | 92 | 120 | 40 | 772 | 19 | 1640 | 14 | 13.3 | 0.52 |
| 15 | 94 | 120 | 40 | 2000 | 19 | 4530 | 36 | 13.3 | −0.32 |
| 15 | 62 | 120 | 65 | 194 | 19 | 116 | 7.0 | 13.3 | 0.74 |

*preferred condition

From an analysis of the above chart, the efficiency (EF) of the direct contact heat exchanger becomes negative if all of the brine flowing through the heat exchanger also flows through the preheater and the boiler even if a preheater some forty times larger than the optimum preheater were used (based on on the fact that h is about forty times greater). In such case, the direct contact heat exchanger will humidify, rather than dehumidify, the air in the enclosure.

Reducing the brine flow rate m from 2000 Kg/h to 772 Kg/h will produce a positive efficiency. However, the level of efficiency is still rather low even though the preheater size (based on the values of h) is some fourteen times larger than the size of the optimum preheater. Only by reducing the brine flow in the second loop to 97 Kg/h is a high efficiency level (0.95) obtained. Thus, the above chart shows that the smaller the brine flow rate m, the smaller the size of preheater required, and the higher the operating efficiency of the direct contact heat exchanger. However, it can be shown that:

$$(S_d - S_i)/S_d = m_o/m \text{ where} \quad (9)$$

$S_d$ = salt concentration of the brine discharged from the boiler (Kg salt/Kg solution)

$S_i$ = salt concentration of brine entering the boiler (Kg salt/Kg solution).

From inspection of Eq. (9), the smaller the brine flow m, the higher the salt concentration $S_d$ of the brine discharged from the boiler. Thus, precipitation of salt may occur. Consequently, even though reducing the brine flow rate in the second loop is desirable for increasing the efficiency, care must be taken not to reduce the flow to a level at which the brine exiting the boiler will be saturated bringing about precipitation of salt.

The most efficient practical system would therefore use a relatively high flow rate of brine in the first loop (through the direct contact heat exchanger), and a relatively low flow rate of brine in the second loop (through the preheater and the boiler). In a practical embodiment of the invention, the flow rate in the first loop is in the ranger 1–2 m³/h, and the flow rate in the second loop is in the range 60–120 liters/h. The provision of restriction 150 in conduit 124 provides an adjustable flow control means for controlling the flow of brine in the second loop. Generally speaking, the constriction in conduit 124 would not have to be adjusted in an actual system. However, provision may be made for varying the flow in the first loop by incorporating a valve in conduit 118 or controlling the speed of rotation of pump 114; and in such case, valve 150 would be of use in relating the flow in the second loop to the flow in the first loop.

Figure 4:
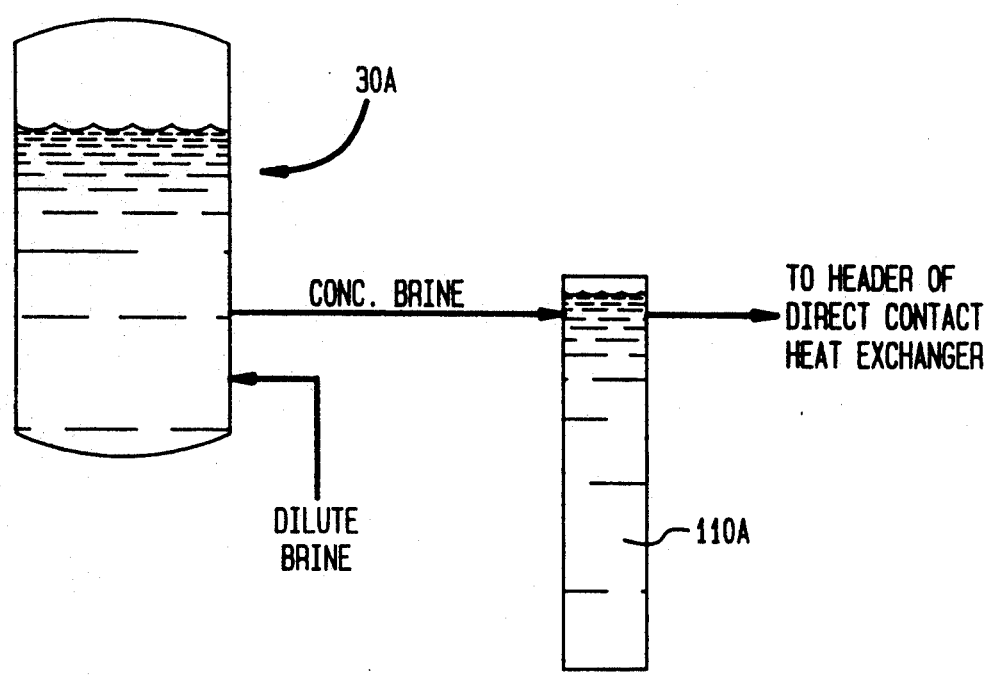
FIG. 4 is an alternative embodiment of the invention shown in FIG. 2.

The provision of standpipe 110 establishes a hydrostatic head that, in addition to effecting proper operation of header 102, also stabilizes the brine flow in the second loop ensuring that the proper amount of brine is in boiler 30A. Note also that the level of the brine in boiler 30A is above the level of brine in reservoir 20A, thus ensuring that the hydrostatic head of brine in the boiler is sufficient to maintain the required flow of brine through preheater 36A without the need for an additional pump. While this is the preferred configuration, concentrated brine may be returned either to header 102 or to standpipe 120 of the direct contact head exchanger. In such case, either a pump would be used or, boiler 30A could be elevated to a position at which the brine level in the boiler is higher than the header. The latter modification is shown in FIG. 4.

Figure 5:
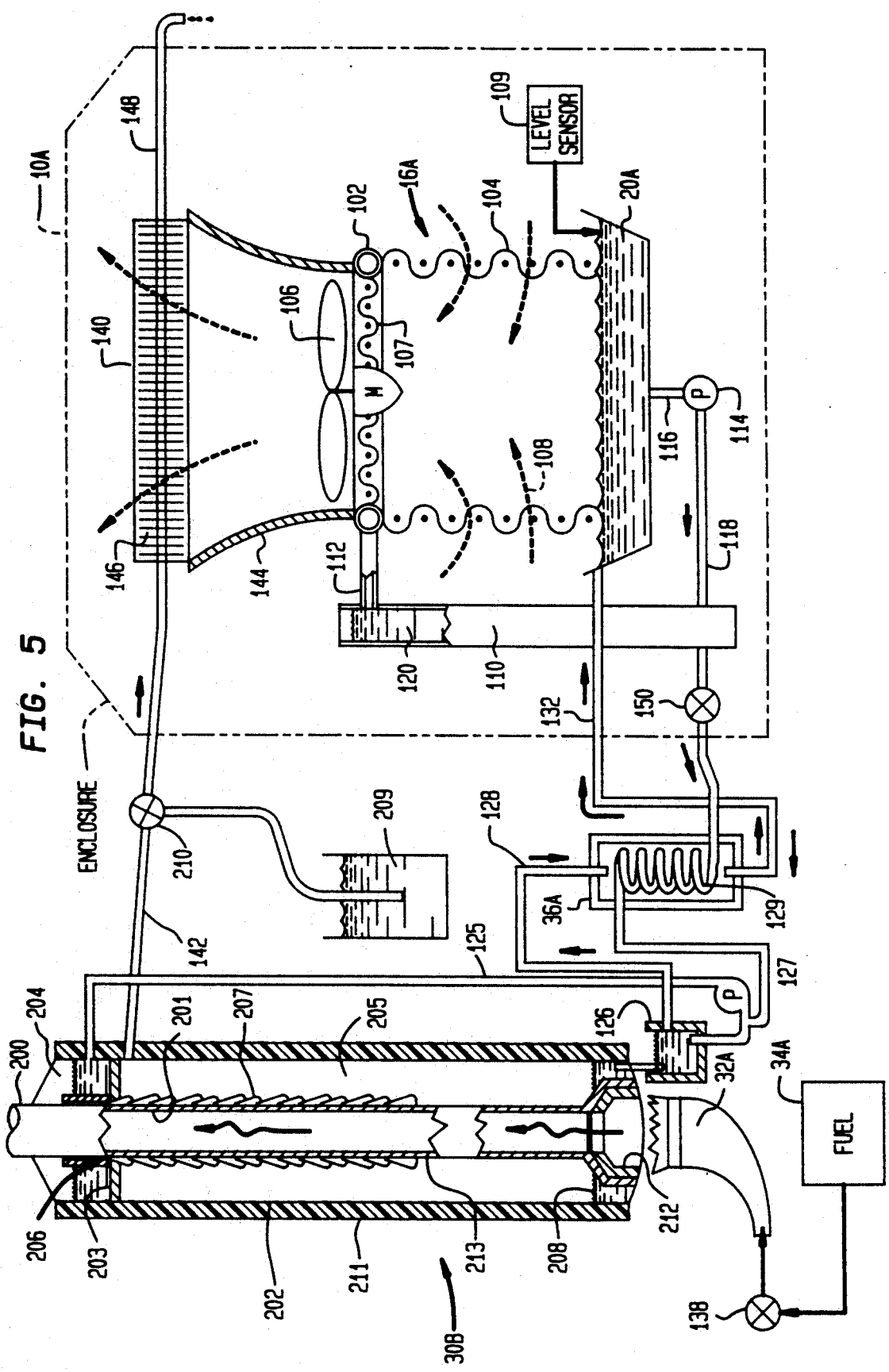
FIG. 5 is a further embodiment of the present invention.

In order to minimize the surface area of the boiler exposed to high temperature brine, thereby minimizing the amount of special, and usually costly materials required for use in the boiler to withstand the corrosive action of high temperature brine, boiler 30B shown in FIG. 5 can be utilized in place of boiler 30A shown in FIG. 2. All the other components shown in FIG. 5 are essentially the same as the comparable components as shown in FIG. 2 and are thus not described in detail.

Boiler 30B includes a heat transfer surface over which dilute brine in the second loop of the apparatus flows in a thin film so that heat contained in the flue gases produced by burner 32A is efficiently transferred into the brine thereby efficiently evaporating water from the dilute brine and producing steam and heated concentrated brine. As shown in FIG. 5, the heat transfer surface is extended in the vertical direction in order to minimize the length of the wetted perimeter thus maintaining sufficient film thickness for a given flow rate. Subsequently, the heated concentrated brine passes in heat exchange relationship with the dilute brine from the first loop as the dilute brine passes to boiler 30B.

Boiler 30B includes vertically positioned stack 200 for receiving flue gases produced by the combustion of fuel 34A in burner 32A at the bottom of the stack, and for protective layer 212, preferably of steel. The hot flue gases flow upwardly in contact with inner surface 201 of the stack. Boiler 30B also includes cylindrical sleeve 202 concentrically surrounding the stack. The upper and lower ends of sleeve 202 are closed; and near the upper end of the sleeve is bulkhead 203 that divides the annular region between stack 200 and sleeve 202 into closed upper annular chamber 204 and closed lower annular chamber 205. Pump 114 in the first brine loop delivers dilute brine from reservoir 20A through conduits 118 and 125 into upper annular chamber 204. An overflow conduit may be provided for chamber 204 to ensure the flow of any excess brine to reservoir 20A, or the heat exchanger. As shown in FIG. 5, the dilute brine also passes through indirect heat exchanger 36A.

Bulkhead 203 is provided with opening 206 for ensuring controlled flow of brine exiting the bulkhead to the outer surface of stack 200. As a consequence, bulkhead 203 is constructed and arranged relative to the stack so that dilute brine in chamber 204 flows as a thin film, designated schematically at 207, on the outer surface of stack 200 downwardly into closed lower annular chamber 205 where the brine collects in pool 208. Brine reservoir 126 and pump 127 cab be used to ensure that brine film 207 has sufficient thickness to substantially reduce or eliminate the danger of overheating the brine that flows in this thin film on the outer surface of stack 200. Brine reservoir 126 also ensures efficient drainage of brine from pool 208, with brine exiting this reservoir via an overflow exit and returning to preheater 36A via conduit 128.

Heat from the flue gases passing vertically inside stack 200 is transferred through the stack into thin film 207 on the outside of the stack heating the dilute brine and causing water in the brine to be evaporated as steam which collects in lower chamber 205 above the pool of heated brine. Turbulators positioned preferably throughout the length of stack 200 can be used to ensure the uniform transfer of heat from the flue gases to the brine flowing in film 207. throughout the length of the stack.

As the thin film flows downwardly on the exterior of stack 200, the brine becomes more and more concentrated. Thus, upper chamber 204 contains relatively dilute brine passed thereto from the first brine loop, and chamber 205 contains relatively concentrated brine. Steam produced inside the lower chamber passes via conduit 142 to either heat store 209, or to heat exchanger 140 in the enclosure in accordance with the position of selector valve 210. Thus, the heat of vaporization of the water contained in the thin film of brine flowing on the exterior of stack 200 can be either returned to the enclosure via heat exchanger 140, or temporarily stored in heat store 209 for return to the enclosure at a later time. In either event, the heat contained in the flue gases which is absorbed by the dilute brine as latent heat of vaporization is returned to the enclosure rather than wasted. Heat loses to the ambient atmosphere are reduced by the provision of insulating material 211 covering the outer surface of sleeve 202.

In order to maintain the hygroscopic nature of the brine in reservoir 20A, the temperature of the brine concentrated in boiler 30B should be returned to the first loop at a temperature as close as possible to the temperature of the brine in reservoir 20A. To this end, heat exchanger 36A is provided. Thus, hot concentrated brine in the pool at the bottom of boiler 30B collects in reservoir 126 and is transferred via conduit 128 into the shell of heat exchanger 36A where the hot concentrated brine flows over coil 129 through which the relatively dilute brine contained in reservoir 20A flows into upper chamber 204 of boiler 30B. In this way, sensible heat added to the brine in boiler 30B by reason of heat transfer associated with the hot flue gases produced by burner 32A is returned to the boiler thus reducing the amount of fuel required to carry out the brine regeneration process.

In a preferred embodiment of heat exchanger 36A, concentrated hot brine flows in an external conduit, and dilute brine flows in the opposite direction through an inner conduit. This double conduit can take the form of a coil positioned in reservoir 20A such that the inner conduit is totally submerged in the brine. Preferably, the external conduit is insulated and constructed form plastic material.

The boiler as shown in FIG. 5 is advantageous because the boiler construction establishes a more uniform heat flux across the heat transfer area that is in direct contact with heated brine, and thus minimizes the amount of corrosion resistant material that must be provided in the construction of stack 200. Such material is preferably enamel coated normal low carbon steel (the enamel coating being on one side and facing the heated brine), although titanium, stainless steel, or an alloy of zinc, tin and copper (admiralty brass) are also appropriate. Moreover, coil 129 in heat exchanger 36A is preferably a zinc, tin and copper alloy coil, although titanium could be used as well. Under some circumstances, a plastic coil may be utilized.

The advantages and improved results furnished by the method and apparatus of the present invention are apparent from the foregoing description of the various embodiments of the invention. Various changes and modifications may be made without departing from the spirit and scope of the invention as described in the claims that follow.

We claim:

1. Apparatus for conditioning air in an enclosure comprising:
   a) a direct contact air/brine heat exchanger;
   b) means for exchanging air in the enclosure with said direct contact heat exchanger;
   c) a reservoir of concentrated brine;
   d) means including a pump for establishing a first brine loop in which brine of said reservoir is exchanged with said direct contact heat exchanger for condensing water vapor in the enclosure onto the exchanged brine to form dilute brine that flows into said reservoir;
   e) means including said pump for establishing a second brine loop including said reservoir;
   f) brine concentrator means for evaporating water from brine in said second loop to produce concentrated brine that is supplied to said reservoir, said brine concentrator means including means for producing a thin film of brine in the second loop, and means for heating the brine and said thin film for evaporating water therefrom; and
   g) a restriction in said second loop for establishing a mass flow rate in the second loop that is smaller than the mass flow rate in the first loop.

2. Apparatus according to claim 1, including means for disposing of water evaporated from said thin film.

3. Apparatus according to claim 2, including means for recovering heat contained in water evaporated from said thin film.

4. Apparatus according to claim 1, including means for recovering heat contained in water evaporated from said thin film.

5. Apparatus according to claim 2, wherein the mass flow rate of brine in said second loop is approximately 1/20th of the mass flow in the first loop.

6. Apparatus according to claim 1, wherein the heat exchange process between the air in the enclosure and the brine in the first loop is substantially isentropic whereby the heat of condensation released as water vapor condenses on the brine is transferred to the contacted air thereby warming the same and causing the temperature of the brine flowing to the direct contact heat exchanger and the temperature of the brine exiting the direct contact heat exchanger to be substantially equal.

7. Apparatus according to claim 1, wherein the heat exchange process between the air in the enclosure and the brine in the first loop is carried our under conditions of constant enthalpy.

8. Apparatus according to claim 1, including means for utilizing heat and water evaporated from thin film.

9. Apparatus according to claim 8, wherein said means for utilizing is constructed and arranged so that the heat is utilized in an enclosure means.

10. Apparatus according to claim 9, wherein said enclosure means is the same as said enclosure.

11. Apparatus for concentrating air in an enclosure comprises:
 a) a direct contact air/brine heat exchanger;
 b) means for exchanging air in the enclosure with said direct contact heat exchanger;
 c) a reservoir of brine;
 d) means including a pump for establishing a first brine loop in which brine of said reservoir is exchanged with said direct contact heat exchanger for condensing water vapor in the enclosure air onto the exchanged brine to form dilute brine that flows into said reservoir, the contact between the enclosure air and exchanged brine being such that a heat exchange process takes place between the contacted air and the exchanged brine under conditions of substantially constant enthalpy whereby the heat of condensation released as the water vapor in the air condenses on the brine, is transferred to the contacted air thereby warming the same and causing the temperature of the brine flowing to the direct contact heat exchanger and the temperature of the brine exiting the direct contact heat exchanger to be substantially equal such that little heat is stored in the brine;
 e) means including said pump for establishing a second brine loop including said reservoir;
 f) brine concentrator means for evaporating water from brine in said second loop to produce concentrated brine that is supplied to said reservoir; and
 g) a restriction in said second loop for establishing a mass flow rate in the second loop that is smaller than the mass flow rate in the first loop.

12. Apparatus according to claim 11, wherein the heat exchange process between the air in the enclosure and the brine in the first loop is carried out under conditions of constant enthalpy.

13. A method for conditioning air in an enclosure comprising the steps of:
 a) exchanging air in the enclosure with a direct contact air/brine heat exchanger;
 b) exchanging brine between a reservoir of brine and said heat exchanger for establishing a first brine loop in which water vapor in the enclosure air is condensed onto the exchanged brine to form dilute brine that flows into said reservoir;
 c) the contact between the enclosure air and exchanged brine being such that a heat exchange process takes place between the contacted air and the exchanged brine under conditions of substantially constant enthalpy whereby the heat of condensation released as the water vapor in the air condenses on the brine, is transferred to the contacted air thereby warming the same and causing the temperature of the brine flowing to the direct contact heat exchanger and the temperature of the brine exiting the direct contact heat exchanger to be substantially equal such that little heat is stored in the brine;
 d) exchanging brine between said reservoir and a brine concentrator for establishing a second brine loop for evaporating water from brine in said second loop to produce concentrated brine that is supplied to said reservoir; and
 e) causing brine in said second loop to flow as a thin film which is heated for evaporating water therefrom.

14. A method according to claim 13 wherein the heat exchange process between the air in the enclosure and the brine in the first loop is carried out under conditions of constant enthalpy.

15. A method for conditioning air in an enclosure comprising:
 a) exchanging air in the enclosure with a direct contact air/brine heat exchanger;
 b) exchanging brine between a reservoir of brine and said heat exchanger for establishing a first brine loop in which water vapor in the enclosure air is condensed onto the exchanged brine to form dilute brine that flows into said reservoir; and
 c) exchanging brine between said reservoir and a brine concentrator for establishing a second brine loop for evaporating water from brine in said second loop to produce concentrated brine that is supplied to said reservoir;
 d) wherein the heat exchange process between the air in the enclosure and the brine in the first loop is conditions of substantially constant enthalpy whereby the temperature of the brine remains substantially constant as the air is warmed and dried, and little heat is stored in the brine.

16. A method according to claim 15 wherein the heat exchange process between the air in the enclosure and the brine in the first loop is carried out isentropically.

* * * * *